United States Patent
Treharne et al.

(10) Patent No.: US 12,252,039 B2
(45) Date of Patent: Mar. 18, 2025

(54) TOWED ELECTRIFIED VEHICLE BRAKING CONTROL

(71) Applicant: Ford Global Technologies, LLC, Dearborn, MI (US)

(72) Inventors: William David Treharne, Ypsilanti, MI (US); Thomas Anthony Vassa, Sparks, NV (US); Anthony Paul Magagnoli, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 17/871,245

(22) Filed: Jul. 22, 2022

(65) Prior Publication Data

US 2024/0025264 A1 Jan. 25, 2024

(51) Int. Cl.
*B60L 7/18* (2006.01)
*B60L 15/20* (2006.01)

(52) U.S. Cl.
CPC ............. *B60L 7/18* (2013.01); *B60L 15/2009* (2013.01)

(58) Field of Classification Search
CPC ............................... B60L 7/18; B60L 15/2009
USPC ........................................................ 701/22
See application file for complete search history.

(56) References Cited

U.S. PATENT DOCUMENTS

| | | | |
|---|---|---|---|
| 6,516,925 B1 | 2/2003 | Napier et al. | |
| 6,866,350 B2 | 3/2005 | Palmer et al. | |
| 7,712,760 B2 | 5/2010 | Ohtomo | |
| 8,700,284 B2 | 4/2014 | Wojtkowicz et al. | |
| 10,688,977 B2 | 6/2020 | Albright et al. | |
| 10,894,534 B2 | 1/2021 | Hiller | |
| 11,007,894 B2 | 5/2021 | Zenner et al. | |
| 12,024,029 B2 * | 7/2024 | Healy | B60L 7/18 |
| 2002/0163249 A1 | 11/2002 | Palmer et al. | |
| 2009/0308670 A1 | 12/2009 | Shepard, Jr. et al. | |
| 2013/0311058 A1 | 11/2013 | Wojtkomicz et al. | |
| 2018/0079375 A1 | 3/2018 | Cekola et al. | |
| 2018/0154874 A1 * | 6/2018 | Kulkarni | B60T 13/08 |
| 2018/0236994 A1 * | 8/2018 | Healy | B60K 6/22 |
| 2019/0039596 A1 * | 2/2019 | Hawley | B60L 58/10 |

(Continued)

FOREIGN PATENT DOCUMENTS

| | | | | |
|---|---|---|---|---|
| GB | 2572144 A | * | 9/2019 | ............... B60D 1/24 |
| WO | 2018064622 A1 | | 4/2018 | |

*Primary Examiner* — Hussein Elchanti
*Assistant Examiner* — Kenneth M Dunne
(74) *Attorney, Agent, or Firm* — Brooks Kushman PC; David B. Kelly

(57) ABSTRACT

An electrified vehicle includes an electric machine, a traction battery selectively connected to the electric machine, a human-machine interface (HMI), and a controller programmed to, after receiving a signal from the HMI enabling towed vehicle operation of the electrified vehicle, control the electric machine to generate a regenerative braking torque in response to deceleration of the electrified vehicle exceeding an associated deceleration threshold and road grade being below a road grade threshold. The controller may also be programmed to control friction brakes of the electrified vehicle in response to the deceleration exceeding the associated threshold. The controller may control brake lights of the electrified vehicle in response to the regenerative braking and/or friction braking. Regenerative and friction braking may be released in response to acceleration exceeding a corresponding threshold.

19 Claims, 11 Drawing Sheets

(56) References Cited

U.S. PATENT DOCUMENTS

| | | | |
|---|---|---|---|
| 2019/0054920 A1* | 2/2019 | Karlsson | B60W 30/18145 |
| 2021/0197673 A1 | 7/2021 | Espig et al. | |
| 2021/0380086 A1 | 12/2021 | Albright et al. | |
| 2023/0121191 A1* | 4/2023 | Rust | B60L 7/18 |
| | | | 701/22 |

* cited by examiner

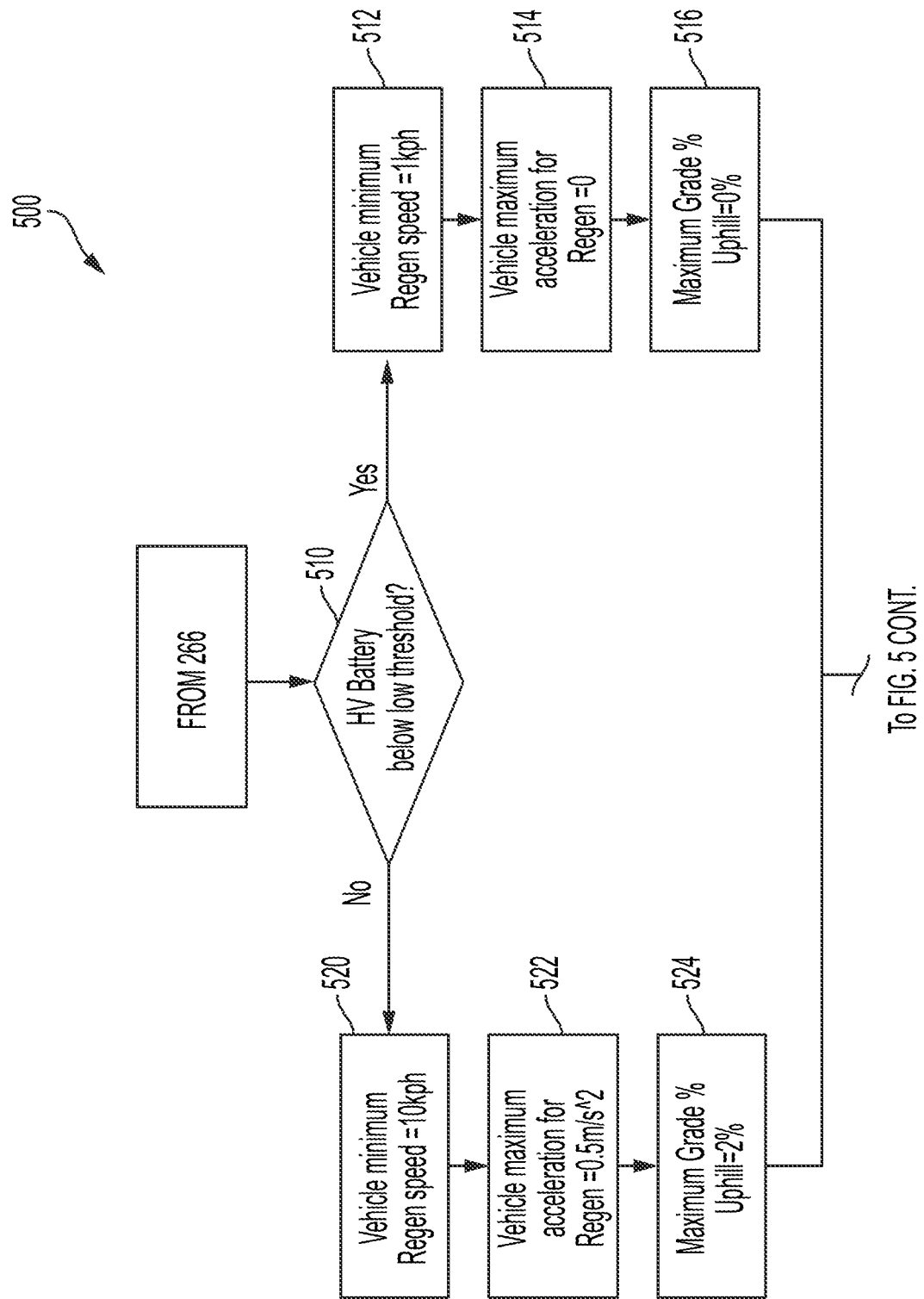

TOWED ELECTRIFIED VEHICLE BRAKING CONTROL

CROSS-REFERENCE TO RELATED APPLICATIONS

This application is related to commonly owned and co-pending U.S. patent application Ser. Nos. 17/871,290 and 17/871,265 both filed on Jul. 22, 2022.

TECHNICAL FIELD

This disclosure relates to controlling braking of an electrified vehicle while being towed by another vehicle.

BACKGROUND

Electrified vehicles may include drivetrains that use electric pumps for lubrication and thermal conditioning of the drivetrain and traction battery. Unlike a non-electrified vehicle that may include one or more mechanical pumps operated by movement of the vehicle, towing of an electrified vehicle in the ignition off state or in a non-propulsion mode will not activate electric pumps, and towing an electrified vehicle in an ignition on state may result in certain undesirable conditions.

Various jurisdictions may require a towed trailer or vehicle over a specified weight to have active braking while being towed. In addition, some jurisdictions require a towed trailer/vehicle to come to a controlled stop if the trailer/vehicle becomes disconnected from the towing vehicle during operation. Trailers and towed vehicles may also be required to provide brake lights, particularly if the towed vehicle obstructs the view of the towing vehicle brake lights. As such, towing vehicles may provide an electric connection to the towed trailer/vehicle to activate braking using a brake pedal pusher or to signal the towed vehicle that the towing vehicle is braking. An electric connection may also be provided to operate brake lights of the trailer, as well as turn indicators, tail lights, and running lights, for example. Some towing vehicles may provide a hydraulic braking signal, or a sensor (mechanical or electrical) is used to detect the vehicle system is decelerating, and the towed vehicle brakes are applied.

SUMMARY

A towed vehicle mode for an electrified vehicle may enable automatic braking assistance using regenerative braking and/or hydraulically actuated friction brakes based on brake activation of the towing vehicle or detection by vehicle speed, acceleration, and/or distance sensors/cameras without an electrical or wireless connection to the towing vehicle. Automatic braking of the towed electrified vehicle may be performed to bring the vehicle to a controlled stop if the vehicle detects disconnection from the towing vehicle. Tail lights and brake lights of the electrified vehicle may be activated without an electrical connection or wireless connection to the towing vehicle. The towed vehicle mode may also control operation of one or more electric pumps to provide lubrication and/or cooling of vehicle components including one or more drivetrain components and the traction battery while the vehicle is being towed. The towed vehicle mode may be selected using a vehicle HMI. Various driver controls, driver assistance features, and alerts may be disabled while in the towed vehicle operating mode, such as automatic emergency braking, object detection, accelerator pedal position-based regenerative braking, lane departure alerts/steering, automatic parking brake operation, automatic gear selection, and similar features. Driver controls, such as cruise control, steering wheel, accelerator pedal, etc. may be disabled as a theft deterrent of the towed vehicle while stopped with the towed vehicle mode active. Low-voltage system support may be provided to power the pump(s) and maintain charge of an associated auxiliary battery using the traction battery and/or regenerative braking of the electrified while the towed vehicle mode is activated. Alerts specific to towed vehicle operation may be transmitted to an associated mobile wireless device. Traction battery charge maintenance or a desired state of charge (SOC) or distance to empty (DTE) upon arrival at the destination may be specified by the user with regenerative energy capture of the towed electrified vehicle controlled to maintain or achieve the specified SOC or DTE. Traction battery charging rate may be controlled to achieve the specified SOC or DTE to minimize the effect on towing vehicle drivability and efficiency and overtaxing of the towing vehicle drivetrain and cooling systems.

In various embodiments, an electrified vehicle includes an electric machine, a traction battery selectively connected to the electric machine, a human-machine interface (HMI), and a controller programmed to, after receiving a signal from the HMI enabling towed vehicle operation of the electrified vehicle, control the electric machine to generate a regenerative braking torque in response to deceleration of the electrified vehicle exceeding an associated deceleration threshold and road grade being below a road grade threshold. The regenerative braking torque may be generated while the electrified vehicle is being towed without an electrical or hydraulic connection to a towing vehicle. The controller may be further programmed to activate brake lights of the electrified vehicle in response to braking torque exceeding a braking torque threshold. The braking torque may include regenerative braking torque and friction braking torque. The controller may be further programmed to control friction brakes of the electrified vehicle in response to the deceleration of the electrified vehicle exceeding the associated deceleration threshold. The controller may be further programmed to release the friction brakes and control the electric machine to stop generating regenerative braking torque in response to acceleration of the electrified vehicle. The controller may be further programmed to apply friction brakes of the electrified vehicle in response to detecting that the electrified vehicle has become disconnected from a towing vehicle, the friction brakes being until the electrified vehicle acceleration exceeds an associated acceleration threshold. The controller may be further programmed to apply friction brakes of the electrified vehicle in response to detecting that the electrified vehicle has become disconnected from a towing vehicle, the friction brakes being released in response to electrified vehicle acceleration exceeding an associated acceleration threshold. The electrified vehicle may include an accelerometer, wherein the controller receives a signal from the accelerometer indicative of deceleration of the electrified vehicle. The controller may be further programmed to calculate the deceleration in response to a vehicle speed signal of the electrified vehicle.

Embodiments may also include a method for controlling an electrified vehicle having friction brakes, an electric machine, a traction battery, and a human-machine interface (HMI), comprising, by a vehicle controller: receiving a signal to activate towed vehicle operation via the HMI, and controlling braking of the electrified vehicle in response to electrified vehicle deceleration exceeding an associated deceleration threshold and road grade being below an associated road grade threshold. Controlling braking may include controlling the electric machine to provide regenerative braking torque to wheels of the electrified vehicle. Controlling braking may include controlling the friction brakes. The method may also include calculating electrified vehicle deceleration based on a vehicle speed signal from a vehicle speed sensor. The method may also include receiving a signal from an accelerometer indicative of electrified vehicle deceleration. In various embodiments, the method includes controlling braking by controlling the electric machine to generate a regenerative braking torque and controlling the friction brakes to generate a friction braking torque until acceleration of the electrified vehicle exceeds an acceleration threshold.

In one or more embodiments, an electrified vehicle system includes an electric machine powered by a traction battery, friction brakes, a human-machine interface (HMI), and a controller programmed to, in response to a towed vehicle operation signal received via the HMI, control the friction brakes and the electric machine to generate a braking torque while the vehicle is being towed by a towing vehicle when electrified vehicle deceleration exceeds an associated deceleration threshold and without receiving an electric or hydraulic braking signal from the towing vehicle. The controller may be further programmed to control the friction brakes and the electric machine to generate the braking torque only when road grade is less than an associated road grade threshold. The controller may be further programmed to control the friction brakes and the electric machine to generate the braking torque until acceleration of the electrified vehicle exceeds a corresponding acceleration threshold. The controller may be further programmed to control brake lights of the electrified vehicle in response to the electrified vehicle deceleration.

One or more embodiments according to the disclosure may have associated advantages. For example, various embodiments facilitate flat towing of an electrified vehicle, which generally requires less effort than a towing trailer/dolly to attach and disconnect, in addition to eliminating the weight of the trailer/dolly in the total system weight. The use of the towed vehicle brakes provides an effective way to help stop the towed electrified vehicle, which may be required in some jurisdictions. Control of an electrified vehicle according to one or more embodiments provides oil lubrication and/or cooling to the drivetrain, supports the low-voltage system including a low-voltage (LV) auxiliary battery without drawing power from the towing vehicle, and maintains or increases the high-voltage (HV) traction battery state of charge (SOC) or distance to empty (DTE) using regenerative braking at a rate that minimizes the effect on the towing vehicle. In addition, control of the towed electrified vehicle maintains the vehicle in Drive gear with Drive gear operation producing no electric machine torque unless HV battery charging is desired. Embodiments may also prevent the towed electrified vehicle from shutting down due to low speed for a period of time, and prevent the towed electrified vehicle propulsion system from entering an active mode (including disabling various driver controls such as the accelerator pedal, steering wheel, gear selector, etc.) until a customer key or authentication device is present to prevent drive away theft. Various embodiments may also include diagnostics to inform the driver if the oil lubrication or battery cooling system is unavailable due to an inoperable pump, LV system, or HV system and provide an alert via a linked wireless device or vehicle components such as flashing lights, horn, siren, etc. The towed electrified vehicle may provide automatic regenerative and/or friction braking to eliminate the need for a brake pedal pusher, using acceleration/deceleration of the towed vehicle in place of or in addition to a braking signal from the towing vehicle.

In addition, various embodiments provide automatic braking of the towed electrified vehicle without any connection (hydraulic or electrical) to the towed vehicle. As such, automatic braking of the towed electrified vehicle is provided without any added hardware, such as a brake pedal pusher, to the towed vehicle to perform this function. However, the towed electrified vehicle may automatically detect and work with a brake pedal pusher system, if desired. Embodiments may also provide the ability for the towed electrified vehicle to come to a complete controlled stop and maintain a stop with the friction brakes if the vehicle has become disconnected from the towing vehicle. Detection of acceleration of the towed vehicle after a breakaway condition has been triggered provides the ability for this condition to be reversed if the friction brakes were applied due to a fast or hard stop of the towing vehicle. One or more embodiments activate the brake lights on the towed electrified vehicle, eliminating the need for a connection to be made to the towing vehicle. Those of ordinary skill in the art may recognize additional advantages based on the following detailed description of representative embodiments according to the teachings of the disclosure.

DETAILED DESCRIPTION

Figure 1A:
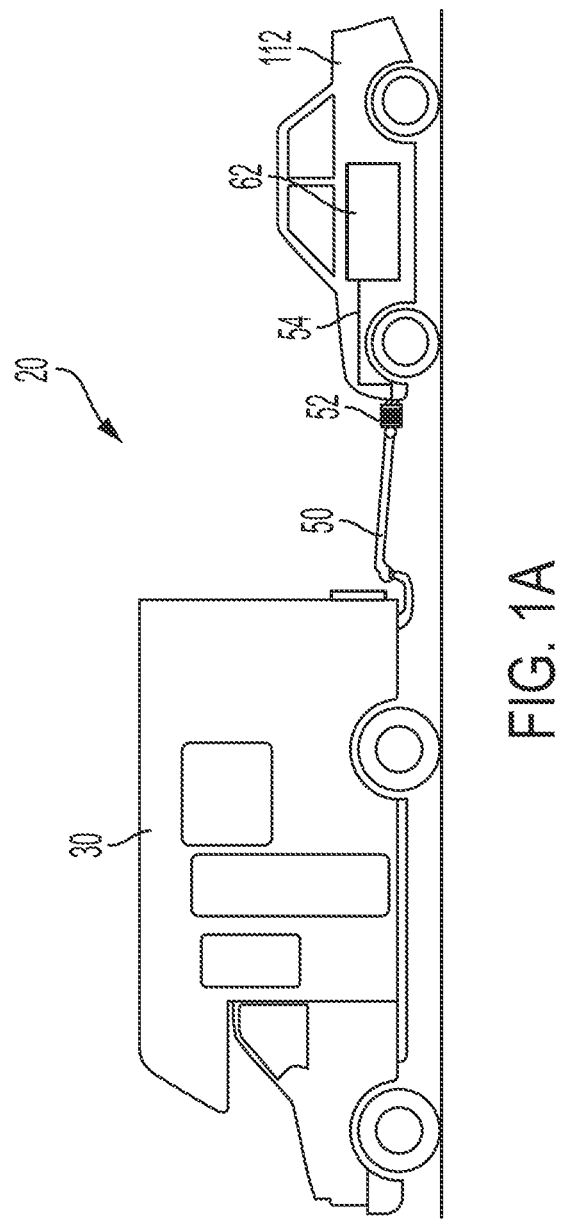
FIG. 1A illustrates a towed electrified vehicle having control features activated for towed vehicle operation according to one or more embodiments.

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

The present inventors have recognized that electrified vehicles, particularly Battery Electric Vehicles (BEVs), are not designed to be flat towed (i.e. all wheels in contact with the road surface) with the ignition off because the transaxle bearings require active lubrication from an electric oil pump. As such, flat towing speed and distance of a BEV may be limited to 35 MPH/50 miles range, for example, to reduce potential bearing wear. While the BEV could be placed in Driving mode while being towed behind a towing vehicle, this could result in the BEV shifting to Park when the vehicle door is closed, and may require the key to be left in the vehicle for the vehicle to actively perform regenerative braking to maintain or increase the HV battery state of charge and support the low-voltage loads. If the vehicle shuts down due to a fault or timeout, the control system may enter Park or Neutral, which can cause tire wear, parking pawl wear, or transaxle bearing wear if the vehicle is subsequently moved. Finally, towing in Drive mode may set diagnostic codes and generate alerts or issues with driver assistance features such as lane centering/departure steering and alerts or emergency braking assist, for example, as the towing vehicle may be identified as a threat requiring active braking or steering intervention. Similarly, certain diagnostic codes may disable or shut down the assistance systems, such as a blocked sensor code, for example. There are also cases where a customer may want to tow the vehicle to recharge a completely depleted HV battery, which may not be possible with current designs. As such, various embodiments according to the disclosure solve one or more of these issues and related issues that may otherwise arise from towing an electrified vehicle while providing one or more advantages with respect to vehicle operation and performance as well as operator convenience.

FIG. 1A illustrates a representative embodiment of a system 20 having a towing vehicle 30 coupled to a towed electrified vehicle 112 by a tow bar 50. While illustrated as a recreational vehicle, towing vehicle 30 may be any type of vehicle and may include a conventional powertrain or be implemented by an electrified vehicle. Similarly, while illustrated as a passenger car, towed electrified vehicle 112 may be any type of vehicle with a partially or fully electrified propulsion system including but not limited to a battery electric vehicle (BEV) or plug-in hybrid electric vehicle (PHEV). In some embodiments, tow bar 50 may include a force or strain sensor 52 that detects the relative push/pull force between the towing vehicle 30 and the towed electrified vehicle 112 for use by towed electrified vehicle 112 in controlling automatic braking, detecting disconnection from the towing vehicle, etc. Tow bar 50 may include an associated electrical connection 54 to supply electric power and/or control signals from towing vehicle 30 to one or more components or systems 62 of towed electrified vehicle 112. As described in greater detail herein, depending on the particular implementation of a towed vehicle operating mode according to this disclosure, a wired or wireless connection between the towing vehicle 30 and towed electrified vehicle 112 may be optional, or may be required for utilization of some, but not all towed vehicle operations. For example, if both the traction battery and auxiliary battery of electrified vehicle 112 are fully depleted, an electrical connection 52 may provide temporary low-voltage power to electrified vehicle 112 sufficient to operate a vehicle HMI to activate the towed vehicle control with temporary limited functionality of electric components until subsequent power provided by regenerative braking or other generator operation of the towed electrified vehicle 112 is sufficient to power the system and charge the auxiliary battery and/or traction battery.

While FIG. 1A illustrates electrified vehicle 112 being flat towed by towing vehicle 30 with all wheels of electrified vehicle 112 in contact with the road surface, the present disclosure is not limited to flat towing with some or all features described herein available for use by electrified vehicles towed by a dolly or similar arrangement with only some of the towed electrified vehicle wheels in contact with the road surface. Those of ordinary skill in the art will recognize various features described herein that may be unavailable or inoperable depending on whether one or more wheels of the electrified vehicle in contact with the road surface are coupled to the electrified vehicle propulsion system including at least one electric machine and energy store. As a non-limiting example, battery charging and regenerative braking may be unavailable or inoperable when none of the wheels of the electrified vehicle contacting the road surface are coupled to the propulsion system.

Figure 1B:
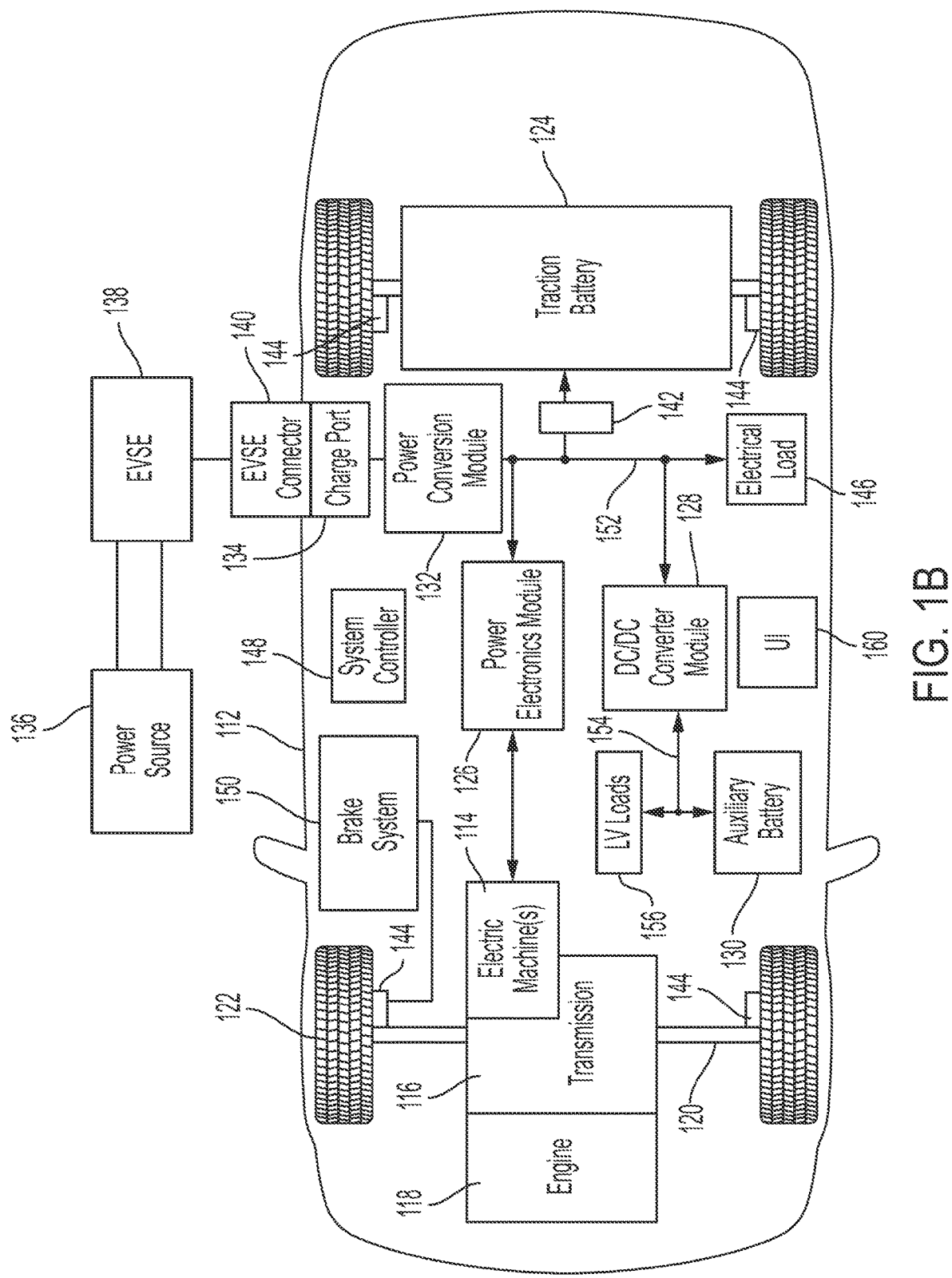
FIG. 1B illustrates a representative electrified vehicle having a controller configured to control various vehicle systems during towed vehicle operation.

FIG. 1B illustrates a representative towed electrified vehicle 112 implemented by a plug-in hybrid-electric vehicle (PHEV) for purposes of illustration and description. As previously described, those of ordinary skill in the art will recognize that towed vehicle operation as described herein may be used in other types of towed electrified vehicles, such as a battery electric vehicle (BEV), which do not include an engine 118. Similarly, towed vehicle operation is not limited to passenger vehicles and may include commercial and transportation vehicles as well as other non-vehicle applications.

A plug-in hybrid-electric vehicle 112 may include one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to one or more of the wheels 122. While representative electrified towed vehicle 112 is illustrated with a front-wheel drive propulsion system, the claimed subject matter is generally independent of the particular type of propulsion system and may include rear-wheel drive, all-wheel drive, four-wheel drive, e-drive systems, for example. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV) without an engine 118 may not be present.

A battery pack or traction battery 124 stores energy that can be used by the electric machines 114. The traction battery 124 may provide a high voltage (HV) direct current (DC) output. As generally understood by those of ordinary skill in the art, high voltage generally refers to voltages above 60 VDC and representative traction battery packs may connect multiple low-voltage cells to operate at a pack voltage in the hundreds of volts, such as 300-800 VDC, for example. Low voltage (LV) systems and components for passenger vehicles may operate at a nominal 12 VDC, while commercial vehicles or transportation vehicles may have LV systems that operate at 24 VDC or 48 VDC, for example.

Towed electrified vehicle 112 may include a contactor module 142 having one or more contactors configured to isolate the traction battery 124 from a high-voltage bus 152 when opened and connect the traction battery 124 to the high-voltage bus 152 when closed. The contactor module 142 may disconnect the HV bus 152 at key-off or when the vehicle is in an accessory (ACC) or other non-propulsion mode. As described herein, activation of a towed vehicle mode may control contactor module 142 to couple the traction battery 124 to the HV bus 152 to provide LV system support, auxiliary battery charging, traction battery charging, and/or regenerative braking.

Contactor module 142 may include one or more contactors to connect or isolate power conversion module or charger 132 from the high-voltage bus 152. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The towed electrified vehicle 112 may include a DC/DC converter module 128 that converts the high voltage DC output from the high-voltage bus 152 to a low-voltage DC level of a low-voltage bus 154 that is compatible with low-voltage loads 156. As illustrated and described in greater detail with respect to FIG. 1C, LV loads may include one or more fluid pumps that pump a lubricating and/or cooling fluid to the vehicle drivetrain or propulsion system, which may include electric machines 114, transmission 116, engine 118, traction battery 124, DC/DC converter module 128, and power conversion module 132, for example. Other LV loads include various system controllers or control modules that power and/or control vehicle accessories, lights, displays, interfaces, driver inputs, etc.

An output of the DC/DC converter module 128 may be electrically coupled to a low-voltage auxiliary battery 130 (i.e., 12V, 24V, or 48V battery) for charging the auxiliary battery 130. The low-voltage loads 156 may be electrically coupled to the auxiliary battery 130 via the low-voltage bus 154. One or more controllers, such as system controller 148 may be powered by the low-voltage bus 154. Similarly, various vehicle actuators, including contactor module 142 may have low-voltage control signals powered by the low-voltage bus, or by drivers of an associated controller or I/O interface that provide low-voltage control signals. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element, and/or an air-conditioning compressor.

As generally understood by those of ordinary skill in the art, low-voltage components may have different voltage levels for operation, and different applications or implementations may utilize different voltage levels for similar components. Low-voltage generally refers to voltages less than 60 VDC (or 30 VAC) with some vehicles having a nominal 12V system, while others have 24V or 48V systems for powering convenience features and controllers. High-voltage generally refers to voltages greater than 60V and may range up to 1500V DC (or 1000 VAC), for example. Typical high-voltage traction batteries for passenger vehicles are in the range of 200-450 VDC while some commercial vehicles include traction batteries operating at 400-800 VDC.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may be electrically coupled to the contactor module 142 as previously described to connect charger 132 to high voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for slowing the vehicle 112 and preventing motion of the vehicle 112. The wheel brakes 144 may be hydraulically actuated, electrically actuated, or some combination thereof to actuate friction pads to contact a disc or drum of the wheel. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as automatic emergency braking, anti-lock braking, and stability control. The controller of the brake system 150 may implement a method of applying a requested brake force when requested by another controller or sub-function, such as system controller 148. When regenerative braking is enabled and available, system controller 148 may coordinate braking force generated by regenerative braking with the braking force of brake system 150 provided by the friction brakes 144. Friction brakes 144 may be applied to all wheels when a parking brake is activated. Some electric vehicles may automatically apply or activate the parking brake after a predetermined time under specified conditions, such as while the vehicle gear selector is in Drive, the vehicle is on an incline, the brake pedal is depressed, driver's door is open with the gear selector in Drive, etc.

As described in greater detail herein, activation of towed vehicle operation may control brake system 150 including regenerative braking and/or friction braking to slow or stop the towed electrified vehicle 112 under various operating conditions, such as if the towed electric vehicle 112 becomes disconnected from the towing vehicle 30, in response to braking of the towing vehicle 30, or to charge the traction battery 124 and/or auxiliary battery 130. Activation of towed vehicle operation may also suspend or modify operation of selected automatic braking functions or features to facilitate towed vehicle operation, such as suspending automatic parking brake apply, automatic emergency braking based on detection of an object, etc.

The electrified vehicle 112 may further include a human-machine interface (HMI) or user interface (UI) 160. The user interface 160 may provide a variety of display elements for communicating information to the operator. The user interface 160 may provide a variety of input elements for receiving information from the operator. The user interface 160 may include one or more displays. The displays may be touch-screen displays that both display information and receive input. The user interface 160 may include discrete lamps/lights. For example, the lamps may include light-emitting diodes (LED). The user interface 160 may include switches, rotary knobs, sliders, and buttons for allowing the operator to change various settings. The user interface 160 may include a control module that communicates via the vehicle network. In various embodiments, the HMI 160 may be used to select or activate towed vehicle operation and may be used to select various options within the towed vehicle operation mode, such as whether to enable regenerative braking, whether to charge traction battery 124, a desired state of charge (SOC) or distance to empty (DTE) for traction battery 124, a charging rate for traction battery 124 (i.e. whether to charge as soon as possible, or spread charging events over anticipated trip time/distance/route), and various other selections and settings that may vary by the particular application and implementation.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network. Additional channels of the vehicle network may include wired or wireless discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not explicitly shown in FIGS. 1A-1C, but it may be implied that the vehicle network may connect to any electronic modules that are present in the vehicle 112. A vehicle system controller (VSC) 148 may be present to coordinate the operation of the various components.

While illustrated as a single controller, controller 148 generally represents multiple vehicle controllers that receive signals from associated sensors and control corresponding actuators. Controllers or control modules may be dedicated to a particular vehicle system, subsystem, or component and may include programmable microprocessor-based controllers and microcontrollers that perform various functions and algorithms based on stored program instructions. Various controllers may communicate over one or more channels of the vehicle network(s).

Figure 1C:
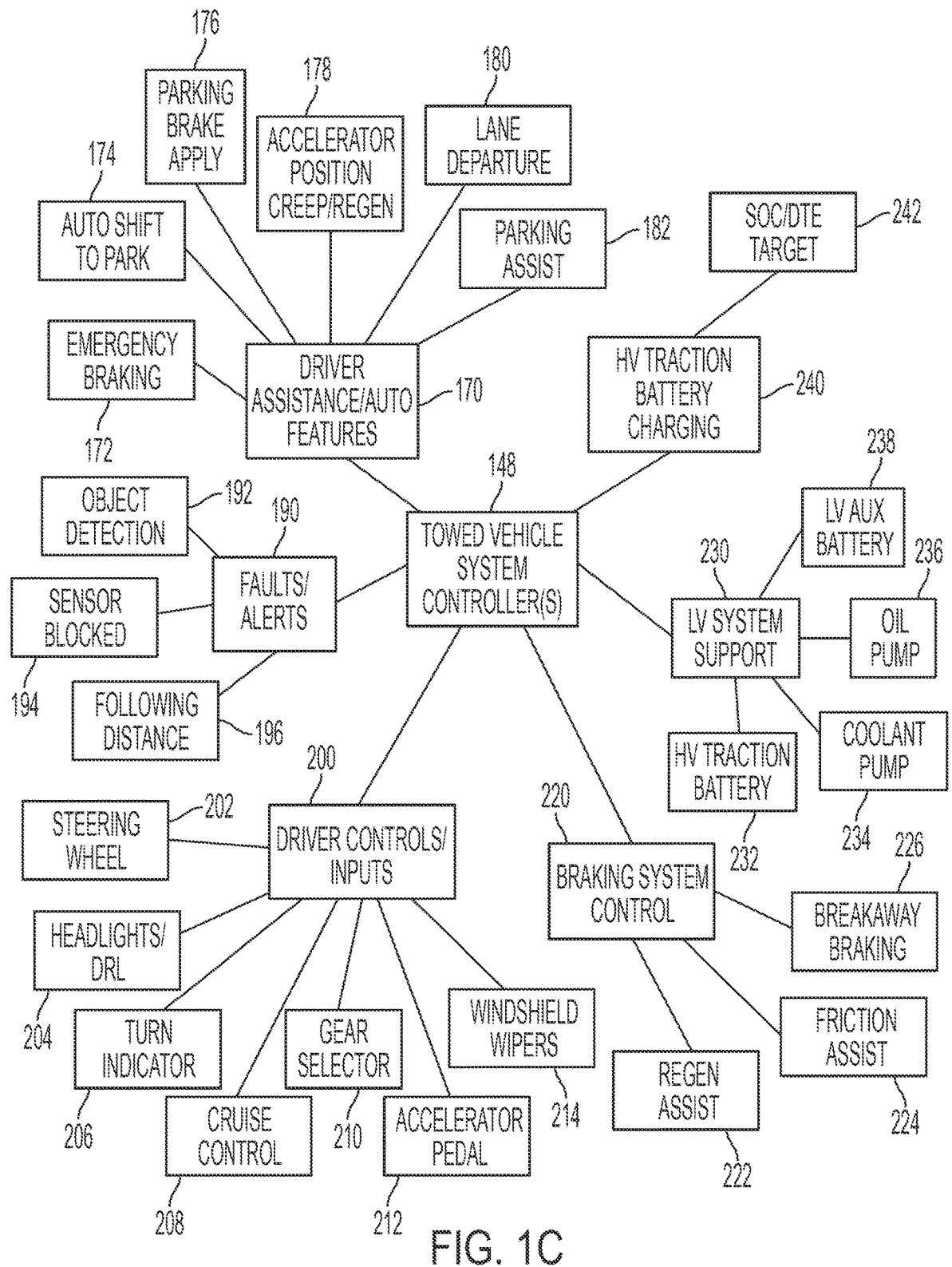
FIG. 1C illustrates representative electrified vehicle sensors, components, driver assistance features and related systems that may be enabled, disabled, or otherwise controlled while a towed vehicle mode is active.

FIG. 1C illustrates representative electrified vehicle sensors, components, driver assistance features and related features and systems that may be enabled, disabled, modified, or otherwise controlled while a towed vehicle mode is active. Towed vehicle system controller(s) 148 may directly or indirectly control various vehicle systems, sensors, actuators, etc. when operating in a towed vehicle mode as previously described. Controller(s) 148 may enable, disable, modify, or otherwise control driver assistance and automatic convenience and similar features as represented at 170, system diagnostics, fault detection, and alerts as represented at 190, driver controls and inputs as represented at 200, braking system control as represented at 220, LV system support as represented at 230, and HV traction battery charging or depletion as represented at 240, for example.

Driver assistance and automatic features 170 may include automatic emergency braking 172 that is otherwise applied in response to detecting an excessive closure rate with respect to a forward object based on vehicle sensors, that may include distance sensors using one or more camera(s), radar, lidar, and similar sensors or detectors. This feature may be disabled or control thresholds modified when operating in the towed vehicle mode to reduce or eliminate inadvertent triggering based on detecting the towing vehicle or any objects that may fall from or be deflected by the towing vehicle.

Automatic shifting of the propulsion system to Park as represented at 174 is a feature that some electrified vehicles include to limit vehicle motion and stop the vehicle if an operator exits the vehicle while the propulsion system is in Neutral, Reverse, or Drive, for example. The feature may normally be triggered based on detecting the driver door being opened with the propulsion system in Drive. Automatic parking brake apply as represented at 176 is a feature that some electrified vehicles include to automatically apply the parking brake under some operating conditions. For example, if the vehicle is stopped on an incline with the gear selector is in Drive for a predetermined time period, such as several minutes, the parking brake may be automatically applied. Accelerator pedal position based torque control as represented at 178 is a feature that some electrified vehicles include to provide automatic regenerative braking when the accelerator pedal is released (lift-pedal braking). Similarly, the vehicle may generate accelerator pedal position-based creep torque when the vehicle gear selector is in Drive, the accelerator pedal is released, and the vehicle speed is below a predetermined threshold. Lane departure steering and/or alerts as represented at 180 is a feature that may provide active steering to center the electrified vehicle within a lane, or to keep the vehicle from crossing a recognized lane marker without the turn signal/indicator active. Parking assist as represented at 182 is a feature that may provide visual or audio alerts and/or active steering based on detecting objects near the vehicle when operating at low speed with the gear selector in Drive or Reverse.

As also illustrated in FIG. 1C, various system faults, diagnostic codes, and/or alerts 190 may be enabled, disabled, or modified when operating in a towed vehicle mode. For example, external object detection 192, sensor blocked 194, and/or following distance 196 alerts or faults may be disabled. Other system faults, alerts, or diagnostic codes specific to towed vehicle operation may be enabled, such as faults and alerts related to electric pump operation, regenerative braking operation, traction battery or auxiliary battery status, etc.

Towed vehicle operation mode may also control or modify control of various driver controls and inputs as represented at 200. Inputs may be disabled as a theft deterrent feature that requires the presence of the vehicle key and key off/on cycle to deactivate the towed vehicle operation mode and reset the vehicle systems. Driver controls and inputs that may have an altered response, may be disabled, or may be otherwise modified include inputs from a steering wheel 202, headlights and daytime running lights (DRL) 204, turn signal indicator 206, cruise control 208, gear selector 210, accelerator 212, and windshield wipers 214, etc. As an example, turn signal/indicator 206 may be disabled so that inadvertent operation when enabling the towed vehicle mode does not continue while the vehicle is being towed. The turn signals, tail lights, brake lights, and other vehicle exterior lighting may be controlled based on an electrical signal from the towing vehicle. Alternatively, or in combination, turn indicators may be controlled in response to automatic detection of an active turn indicator of the towing vehicle using one or more vehicle cameras or sensors such that a wired or wireless connection to the towing vehicle is not required. Similarly, brake lights may be controlled in response to detecting active brake lights of the towing vehicle, or in response to applying friction brakes of the towed vehicle. Operation of headlights/DRL 204 based on ambient lighting or gear selector position may be disabled regardless of the particular setting of the headlight control knob. Accelerator pedal 212 input may be disabled to prevent vehicle drive-away theft. Various other systems or features that may otherwise unnecessarily use power from the towed vehicle may be disabled, such as windshield wipers 214, vehicle ambient lighting, infotainment system/speakers, climate control, etc. Depending on the particular application and implementation, the towed vehicle operation mode may provide various configuration settings or options for the user to select particular features to enable/disable and/or select a modified response for a particular feature. For example, the system may allow operation of the vehicle climate control based to heat/cool the vehicle cabin while being towed and/or specify a minimum battery SOC or DTE for operation of climate control. Those of ordinary skill in the art may recognize numerous other settings or configuration options that may be used to control individual vehicle features or inputs based on the representative examples of this disclosure.

The towed vehicle system controller(s) 148 may also enable, disable, or modify control of various braking system features/functions as represented at 220. This may include providing regenerative braking assist 222, friction braking assist 224, and breakaway braking 226. Regenerative braking assistance as represented at 222 may be provided to slow the electrified vehicle in response to a braking signal from the towing vehicle, or may be automatically actuated by detecting deceleration of the towed vehicle using towed vehicle speed sensors or accelerometer, for example, as described in greater detail herein. Regenerative braking assist may be activated independently from regenerative braking used to charge the traction battery. Similarly, friction braking assist 224 may be provided in response to a braking signal from the towing vehicle, or may be automatically actuated. Breakaway braking 226 detects disconnection of the electrified vehicle from the towing vehicle and may be used to bring the towed electrified vehicle to a controlled stop and apply the parking brake as described in greater detail with respect to FIGS. 2-8. Other braking system control functions may be modified when the vehicle is operating in a towed vehicle mode, such as traction control or stability control, for example.

Low voltage system support 230 may include control of the HV traction battery system 232 to close associated contactors to couple the traction battery to the HV bus to operate a coolant pump 234 and/or oil pump 236 or to charge the LV auxiliary battery 238. As previously described, the traction battery may supply power to the LV bus via a DC/DC converter. Depending on the particular system configuration and settings, the traction battery may be coupled to the HV bus to operate HV or LV loads as previously described. Similarly, coolant pump 234 and/or oil pump 236 may be powered by LV auxiliary battery 238 via the LV bus under various operating conditions with LV system support 230 provided by the HV traction battery 232 to charge the LV auxiliary battery 238 based on associated operating thresholds or settings for the HV traction battery 232 and LV auxiliary battery 238.

Towed vehicle operation mode may also enable, disable, or modify control of the HV battery charging as represented at 240. As described in greater detail with respect to FIGS. 2-8, HV traction battery charging may be enabled while the electrified vehicle is being towed using regenerative braking to achieve or maintain a desired SOC or DTE 242 for the traction battery. Alternatively, or in combination, the system may use regenerative braking to charge the traction battery to a minimum SOC to provide LV system support and various other functionality while the vehicle is being towed regardless of whether the user has activated traction battery charging or selected a desired target SOC/DTE 242.

FIGS. 2-8 illustrate operation of a system or method for controlling an electrified vehicle having a towed vehicle operating mode. Control logic or functions performed by one or more controllers, modules, processors, etc. is generally represented in the diagrams of FIGS. 2-8. This illustration provides a representative control strategy, algorithm, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed. Similarly, the order of processing is not necessarily required to achieve the features and advantages of the claimed subject matter as described herein, but is provided for ease of illustration and description. The control logic may be implemented primarily in software executed by a microprocessor-based vehicle, engine, electric machine, and/or powertrain controllers, generally represented by system controller 148 of FIG. 1B. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize solid state, electric, magnetic, and/or optical storage to keep executable instructions and associated calibration information, operating variables, and the like.

Figure 2:
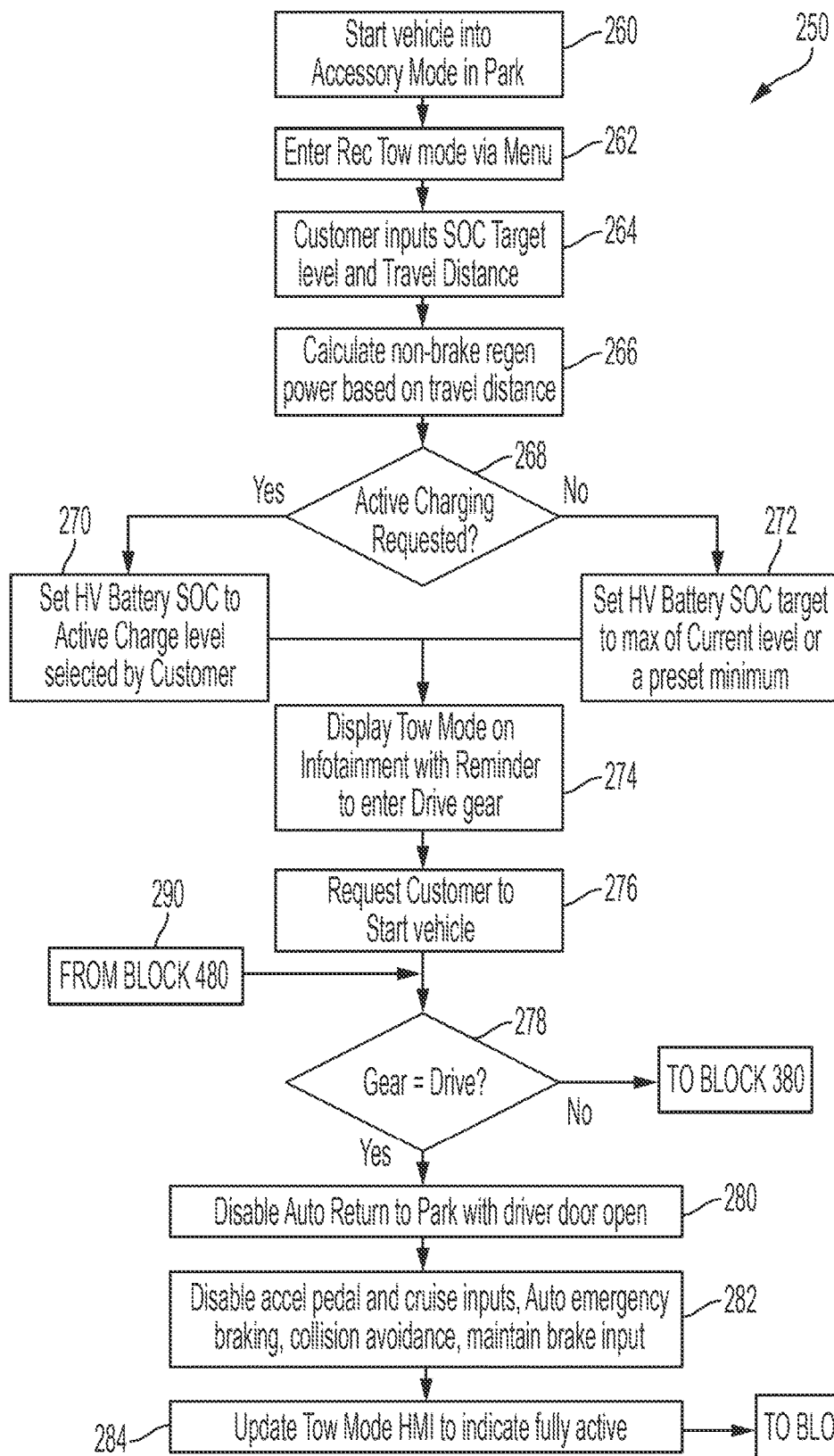
FIGS. 2-3 are block diagrams illustrating operation of a system or method for controlling a towed electrified vehicle including activation of a towed vehicle mode via a vehicle human-machine interface (HMI).
Figure 3:
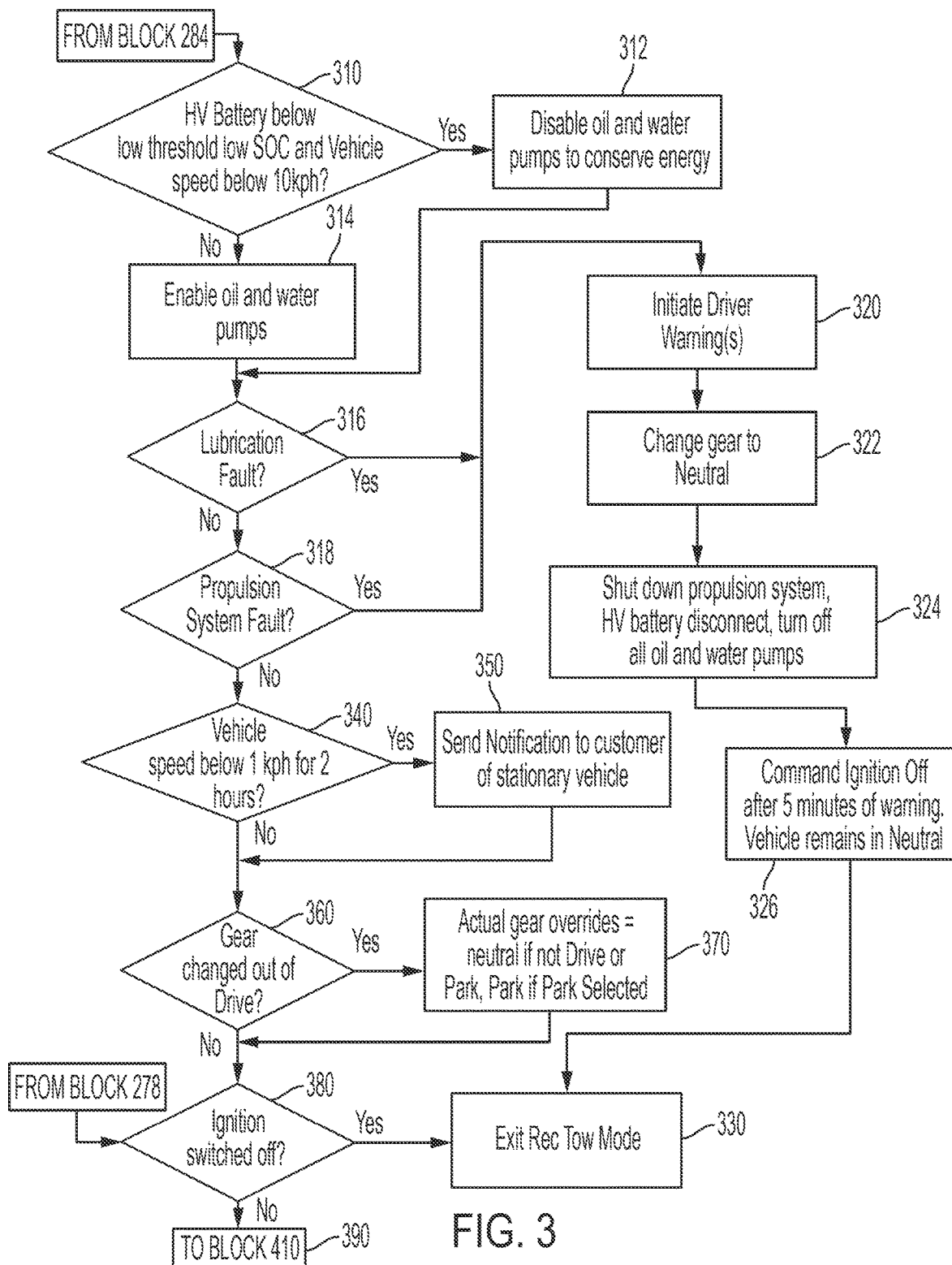

FIGS. 2-3 are block diagrams illustrating operation of a system or method for controlling a towed electrified vehicle including activation of a towed vehicle mode via a vehicle human-machine interface (HMI).

As illustrated in FIG. 2, representative control logic or algorithm 250 begins at block 260 with starting the vehicle in Accessory mode with the gear selector in Park. As generally understood by those of ordinary skill in the art, the Accessory mode powers various vehicle convenience features using the LV auxiliary battery but does not enable propulsion of the vehicle. In contrast, a Run mode powers the system using the HV traction battery and enables vehicle propulsion. Activation of a Run/Drive mode often requires depressing the brake pedal while pressing a Start/Ignition button. In one or more embodiments according to the present disclosure, the HV traction battery contactor may be closed while operating in towed vehicle mode with the ignition in Accessory mode to provide LV system support, regenerative braking, HV traction battery charging, and various other system features and functions as described herein. While in Accessory mode, the towed electrified vehicle HMI may display a menu on an associated touchscreen an generate a towed vehicle operation signal in response to an operator selecting the recreational tow mode as represented at 262. As an anti-theft deterrent, once entered, the towed vehicle operation mode cannot be exited without an ignition/key power off cycle, which requires presence of the vehicle key to restart the vehicle and enter propulsion (Drive) mode.

The operator may input a desired target SOC (or DTE) for the traction battery as well as a travel distance or duration as represented at 264. Alternatively, travel distance, trip duration and/or route may be entered via the vehicle navigation system, or transferred from a mobile device, such as a smartphone, by a wired or wireless connection to the electrified vehicle. The system then calculates a non-braking regenerative power estimate to achieve the desired target SOC based on the travel distance, route, or time as represented at 266 and described in greater detail with reference to FIGS. 5-6. The non-braking regenerative power is used to control the electric machine(s) to operate as generator(s) to charge the traction battery, which may in turn be operated to charge the LV auxiliary battery in various embodiments.

Block 268 determines whether active charging of the traction battery has been requested via the HMI menu. If Yes, block 270 sets the HV traction battery desired target SOC (or DTE as illustrated and described with reference to FIG. 7) to an active charge level as selected by the user. If No, block 272 sets the HV traction battery SOC target to the higher of the current SOC or preset minimum SOC. Block 272 will charge the HV traction battery to the minimum SOC or maintain the current SOC while being towed. Block 274 displays a towed vehicle mode message on the vehicle HMI with a reminder to verify that the towed vehicle is properly coupled to the towing vehicle and that the vehicle must be placed in Drive gear after starting the vehicle as represented at 276. Block 290 provides a non-braking regenerative energy capture for HV traction battery charging as illustrated and described with reference to FIG. 4.

Block 278 determines whether the gear selector is in Drive. If No, control continues to block 380 of FIG. 3. If Yes, block 280 disables one or more driver assistance or convenience features that are undesirable in towed vehicle operation mode. In the representative example of FIG. 2, block 280 disables automatic return to Park, which may otherwise shift the vehicle into Park upon detecting that the driver door is open with the vehicle at low speed and in Drive. Block 282 disables one or more driver inputs/controls as previously described, which may include the accelerator pedal, cruise control, headlight mode selector, etc. Brake pedal control remains active to allow use of a commercially available third-party brake pedal pusher in the towed vehicle if desired. Block 284 displays via the HMI that the towed vehicle mode is fully active and control continues with block 310 of FIG. 3.

Block 310 of FIG. 3 determines whether the HV traction battery is depleted to below a minimum SOC where the vehicle would not be drivable without being towed, but has sufficient power to close the HV traction battery contactors so that the traction battery is coupled to the HV bus. Block 310 also determines whether the vehicle speed is below a speed threshold, such as 10 kph. If Yes, the towed electrified vehicle will attempt to conserve power by keeping the electric pumps off as represented at 312 until the traction battery reaches the minimum SOC or the vehicle speed exceeds the speed threshold where regenerative power capture is sufficient to charge the traction battery and/or operate the electric pumps as previously described. If No at block 310, then the electric pumps are enabled for operation as represented at 314. After being enabled, the pumps may be controlled to operate continuously or intermittently in response to corresponding operating criteria, such as cooling system temperature, vehicle speed, elapsed time, etc. to maximize system efficiency.

Block 316 monitors operation of the lubrication system including the lubrication pump, which may include monitoring pressure, flow, temperature, or other feedback signals, for example. If no lubrication fault is detected, block 318 monitors the propulsion system for proper operation. Propulsion system monitoring may detect the HV battery contactor opening, a DC/DC converter fault, electric machine fault, electric isolation fault, or HV battery depleted below a shutdown threshold, for example. If a lubrication fault is detected at 316 or a propulsion system fault is detected at 318, then block 320 generates a corresponding alert and may store one or more corresponding diagnostic codes. The corresponding alert(s) may be transmitted to a mobile device via a wired or wireless connection between the towed electric vehicle and the towing vehicle to alert the driver of the towing vehicle. As a non-limiting illustrative example, alerts may be communicated via cellular, Bluetooth, Wi-Fi, or similar wireless technologies to a smartphone app with a push notification to alert the driver. Alternatively, a wired connection between the towed vehicle and the towing vehicle may generate a prompt on the towing vehicle HMI, or illuminate a dedicated LED, for example. In one or more embodiments, alerts may include an intermittent horn beep with a predetermined pattern, lights flashing, and/or headlights flashing, for example.

In response to the lubrication and/or propulsion system fault, block 322 may automatically shift the propulsion system from Drive to Neutral while inhibiting any other fault responses that may otherwise shift the towed vehicle to Park or apply the parking brake to reduce or eliminate undesirable wear to various propulsion system components. The propulsion system is then shut down, the HV traction battery contactor is opened to disconnect the traction battery from the HV bus, and the electric oil and water pumps are turned Off as indicated at 324. After a predetermined time, such as five minutes for example, the ignition system is automatically commanded Off with the vehicle remaining in Neutral as represented at 326 to preserve the LV auxiliary battery charge and the towed vehicle operating mode is exited as indicated at 330.

If neither block 316 nor block 318 detect a fault, then block 340 monitors vehicle speed of the towed electrified vehicle to determine whether the vehicle is stationary based on vehicle speed being below an associated threshold for a predetermined period of time, such as being below 1 kph for 2 hours, for example. If Yes, block 350 may alert the user via a wired or wireless alert and/or using one or more vehicle audible or visual notifications similar to those previously described with respect to block 320. This alert reminds the user that the towed vehicle has been stationary while the towed vehicle operation mode is active to reduce the possibility for unintended depletion of the LV auxiliary battery and/or the HV traction battery. If No, or after sending notification to the user, block 360 determines whether the vehicle remains in Drive. If the vehicle is no longer in Drive mode, then block 370 may override the gear selection and shift to Neutral, unless Park is selected, in which case the vehicle will remain in Park.

Block 380 determines whether the ignition has been switched to Off and if Yes, exits the towed vehicle operation mode as represented at 330. Otherwise, control continues with block 410 of FIG. 4 as represented at 390.

Figure 4:
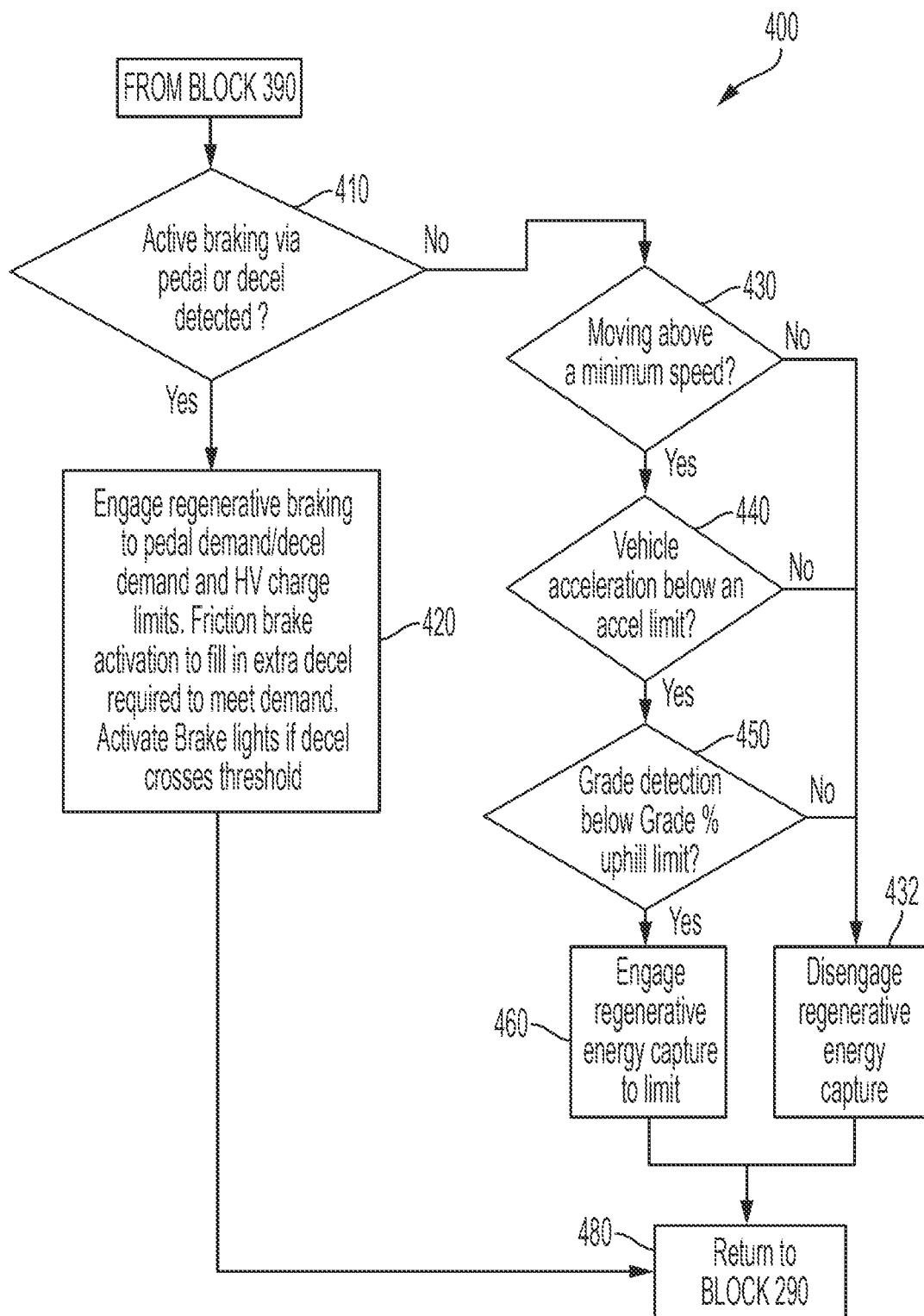
FIG. 4 is a block diagram illustrating operation of a system or method that controls the braking system for active braking or regenerative energy capture for traction battery charging in an electrified vehicle while towed vehicle operation is enabled.

FIG. 4 is a block diagram illustrating operation of a system or method that controls the braking system for active braking or regenerative energy capture for traction battery charging in an electrified vehicle while towed vehicle operation is enabled. System or method 400 determines whether an active braking signal or condition has been detected as represented at 410. The active braking signal may be detected in response to depressing of the vehicle brake pedal by a commercially available brake pedal pusher installed in the vehicle. Alternatively, or in combination, the towed vehicle may receive a braking signal from a wired connection to the towing vehicle, or may automatically engage active braking in response to vehicle deceleration exceeding a threshold. Towed vehicle deceleration may be determined by monitoring towed vehicle speed and/or from one or more accelerometers, for example. If yes, block 420 may engage regenerative braking and/or friction braking to meet the active braking demand, with regenerative braking subject to traction battery SOC and charge rate/current limits. The towed vehicle brake lights may also be activated based on a signal from the towing vehicle, an active braking request exceeding a corresponding threshold, or a towed vehicle deceleration exceeding a corresponding threshold, for example. Control then continues to block 290 of FIG. 2 as represented at 480.

If an active braking request is not detected at 410, then the system continues to determine whether operating conditions are favorable for regenerative energy capture to charge the traction battery as generally represented by blocks 430-480. In the representative embodiment illustrated, block 430 determines whether the towed vehicle is above a minimum regenerative energy recapture threshold. If Yes, block 440 determines whether the towed vehicle acceleration is below a corresponding threshold, and block 450 determines whether the detected road grade is below a corresponding threshold so that regenerative energy capture does not adversely affect the ability of the towing vehicle to accelerate or maintain speed while ascending a grade. If the conditions of blocks 430, 440, and 450 are satisfied, then regenerative energy capture is engaged as indicated at 460 with the rate of capture determined as illustrated and described in greater detail with respect to FIG. 5. If any of the conditions of blocks 430, 440, or 450 is not satisfied, then the regenerative energy capture is suspended or disengaged as represented at 432. Control then continues to block 290 of FIG. 2 as represented at 480.

Figure 5:
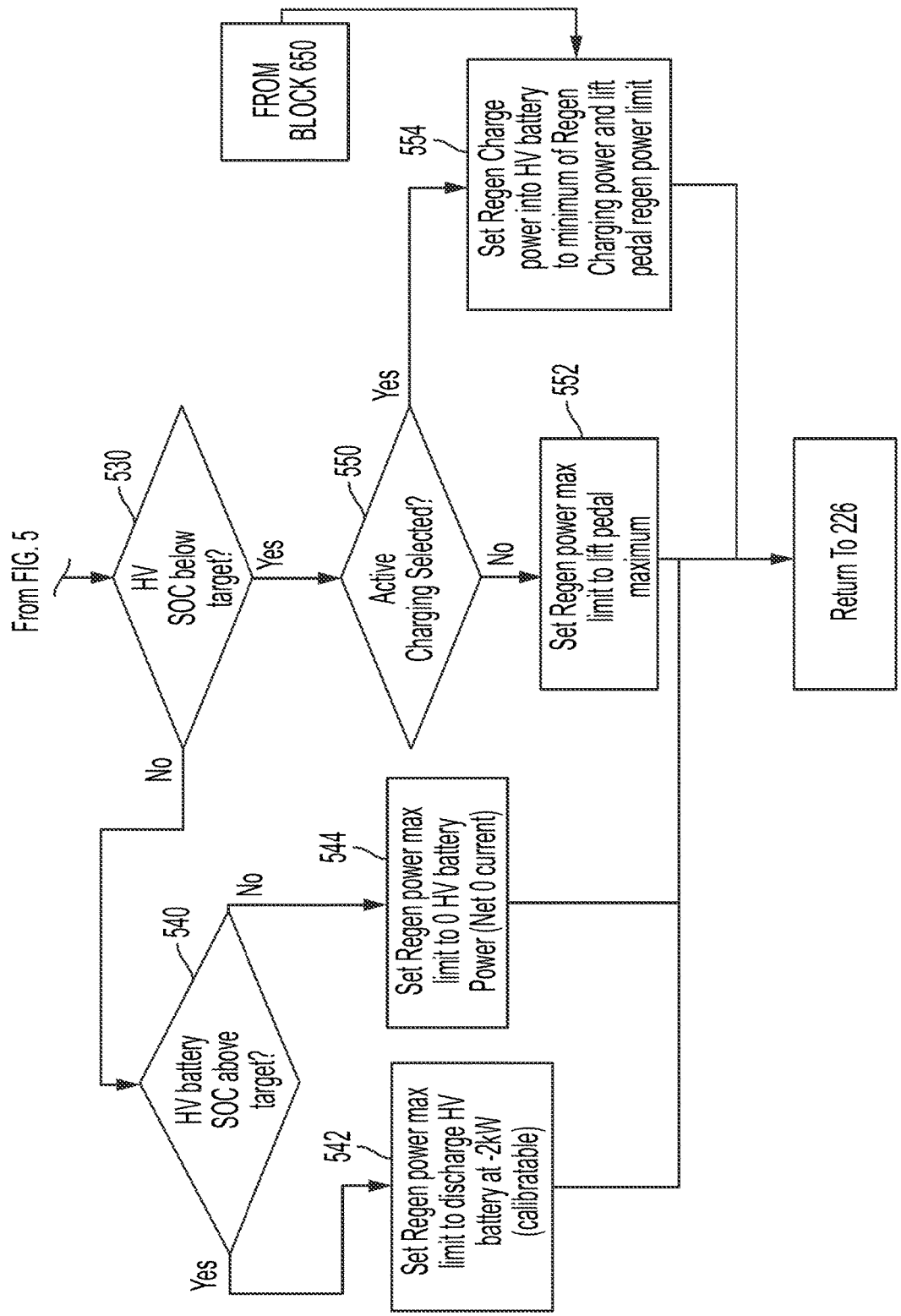
FIGS. 5-6 are block diagrams illustrating operation of a system or method that controls non-braking regenerative energy capture to achieve or maintain a battery target state of charge (SOC) in an electrified vehicle while being towed.
Figure 6:
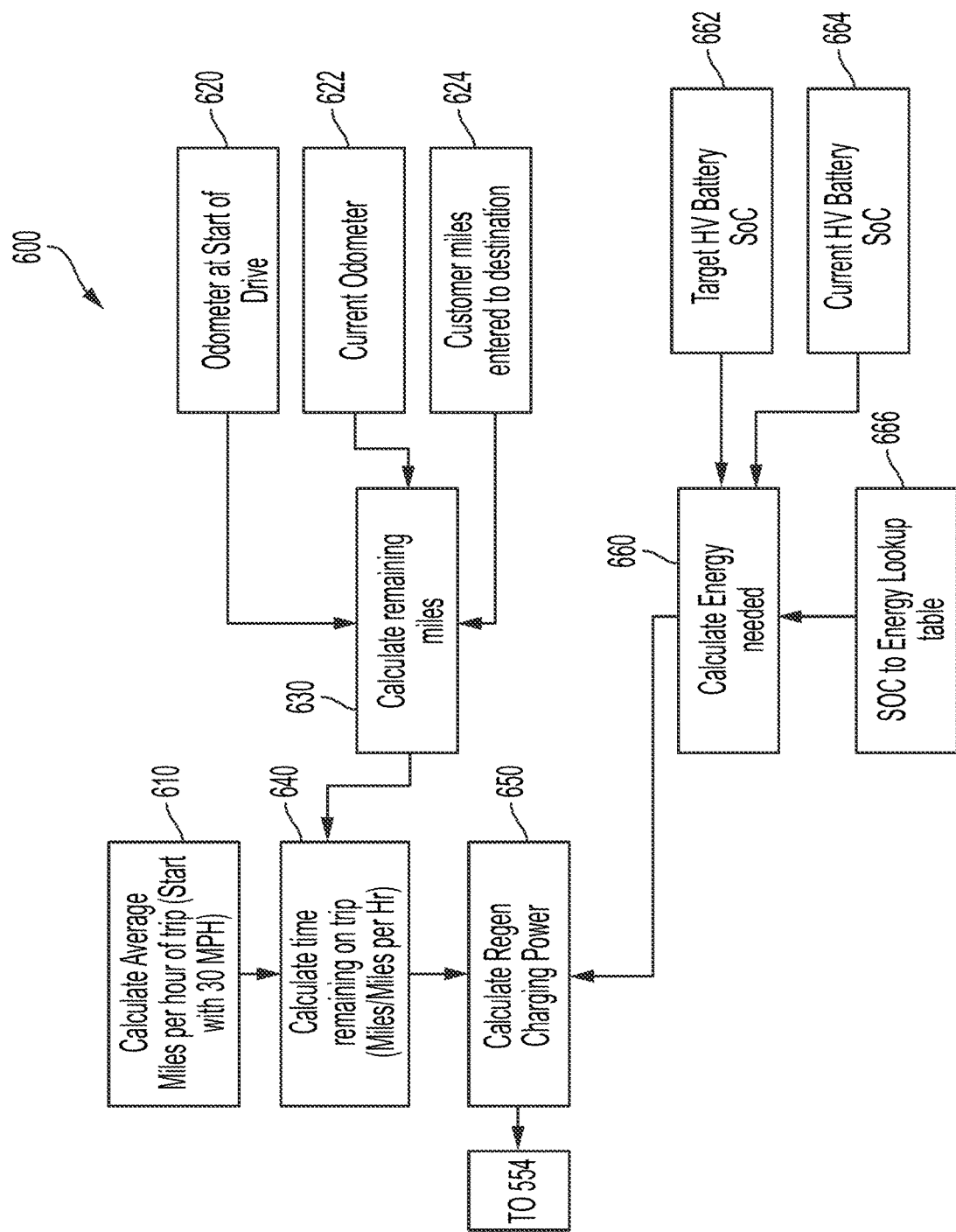

FIGS. 5-6 are block diagrams illustrating operation of a system or method that controls non-braking regenerative energy capture to achieve or maintain a battery target state of charge (SOC) in an electrified vehicle while being towed. As shown in FIG. 5, system or method 500 determines whether the HV traction battery SOC is below an associated minimum low threshold for vehicle operation. If Yes, then blocks 512, 514, and 516 set associated respective thresholds for minimum vehicle speed, maximum vehicle acceleration, and maximum grade to enable HV traction battery charging to different, lower thresholds relative to the respective thresholds of blocks 520, 522, and 524, which are set when the HV traction battery SOC is above the minimum low threshold as determined at block 510. In the representative embodiment illustrated, block 512 sets the vehicle minimum speed to 1 kph, block 514 sets the vehicle maximum acceleration to zero, and block 516 sets the maximum grade to zero so that regenerative energy capture may occur under more operating conditions than the thresholds of blocks 520, 522, and 524 to charge the HV traction battery to the minimum low threshold for vehicle operation. In the representative embodiment illustrated, block 520 sets the vehicle minimum speed to 10 kph, block 522 sets the vehicle maximum acceleration to 0.5 m/s$^2$, and block 524 sets the maximum grade to 2%. Of course, thresholds may vary depending on the particular electrified vehicle configuration and desired performance specifications for various vehicle applications and implementations.

Block 530 determines whether the HV traction battery SOC is below the target threshold, which may be specified by the user via the HMI or may be a default target or a target otherwise determined by the vehicle controller(s). If No, block 540 determines whether the HV traction battery SOC is above the target threshold. If Yes, block 542 sets the non-braking regenerative energy capture maximum power limit to a negative value to discharge the HV traction battery to a calibratable level, such as −2 kW in this example. Otherwise, the non-braking regenerative energy capture maximum limit is set to zero (to provide zero net current to the traction battery) as represented at 544. It should be noted that regenerative capability may also be expressed as a torque limit as a function of vehicle speed as power is equivalent to torque multiplied by speed. The corresponding regenerative power limit from blocks 542 or 544 is then provided to block 266 of FIG. 2 as represented at 560.

If block 530 determines that the HV traction battery SOC is below the target SOC, then block 550 determines whether active charging has been selected via the HMI when entering the towed vehicle operation mode. If Yes, then block 554 sets the non-braking regenerative charging power to the minimum or lesser of the regenerative charging power and the lift pedal regenerative power limit as described with respect to FIG. 6. Otherwise, block 552 sets the regenerative power maximum limit to the lift pedal maximum as described with respect to FIG. 6. The corresponding regenerative power limit from blocks 552 or 554 is then provided to block 266 of FIG. 2 as represented at 560.

As illustrated by diagram 600 of FIG. 6, the non-braking regenerative energy capture calculates an average speed for the trip as represented at 610. The average speed may have a default minimum value, such as 30 mph, for example. The odometer reading at the start of a trip as represented at 620 is used in combination with the current odometer reading at 622 and the total trip distance at 624 to calculate the trip distance remaining at 630. As previously described, the trip distance may be manually entered via the HMI, entered via a connected mobile device, or obtained from the vehicle navigation system if a destination has been entered. The remaining trip distance from block 630 and the average speed from block 610 is used to calculate the trip time remaining at 640. The energy needed to achieve the desired target HV traction battery SOC by the end of the trip is determined at 660 based on the target HV traction battery SOC at 662, the current HV traction battery SOC at 664, and a lookup table or calculation that provides a relationship between SOC and energy as represented at 666. The remaining trip time from block 640 and the energy needed to charge the traction battery as determined at 660 is used to calculate the non-braking regenerative energy capture power as represented at 650, which is then used to determine the regenerative charge power into the HV traction battery as previously described with respect to block 554 of FIG. 5.

Figure 7:
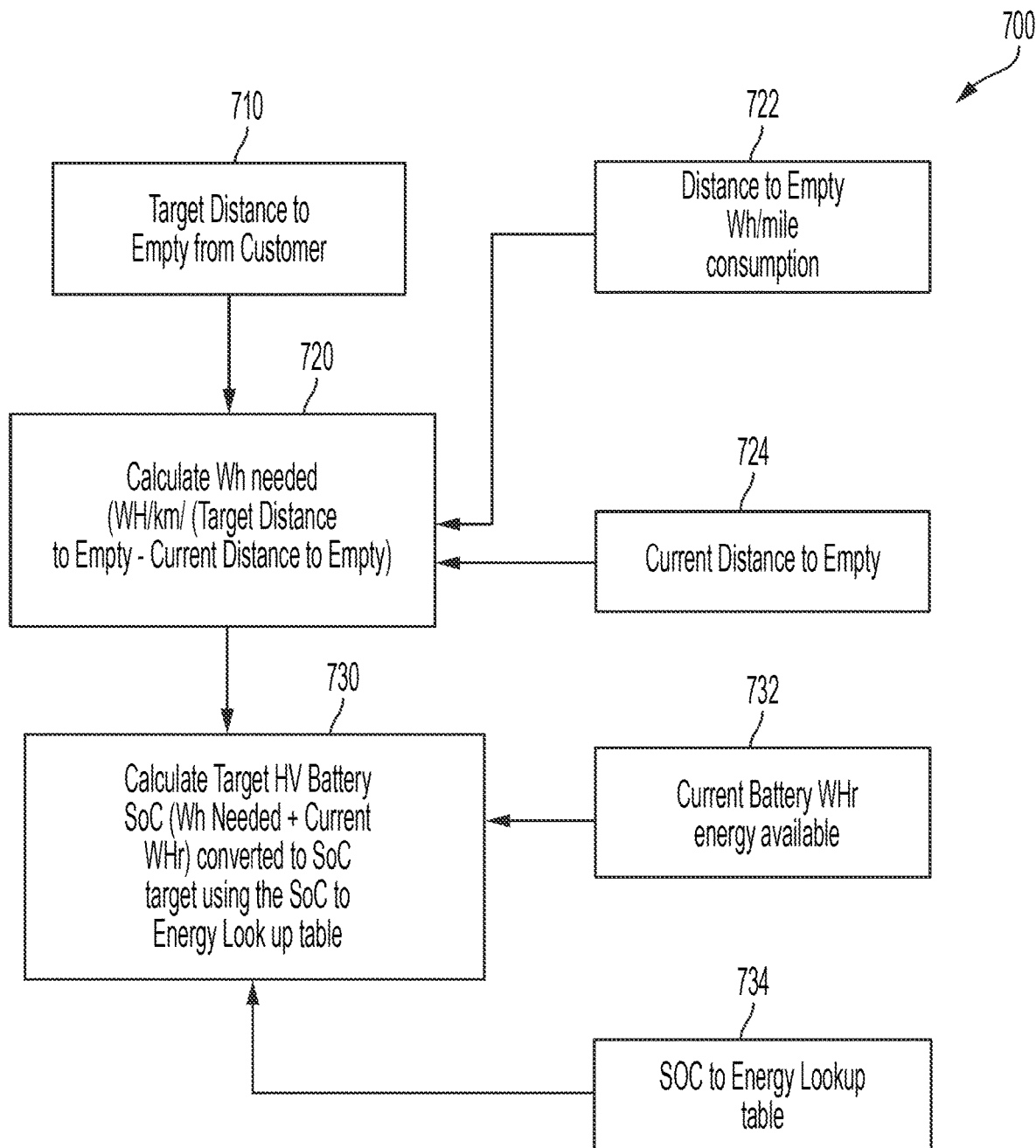
FIG. 7 is a block diagram illustrating operation of a system or method that uses a desired range or distance to empty (DTE) to control battery charging in an electrified vehicle while being towed.

FIG. 7 is a block diagram illustrating operation of a system or method that uses a desired range or distance to empty (DTE) to control battery charging in an electrified vehicle while being towed. Algorithm 700 may be used to determine a target traction battery SOC for the electrified vehicle based on a desired range or DTE entered via the HMI as represented at 710. Block 720 calculates the Watt-hours (WH) needed based on the DTE consumption (WH/mi) as indicated at 722 and the current DTE as indicated at 724. Block 730 calculates the target HV traction battery SOC using a corresponding lookup table to convert SOC to energy based on the current HV traction battery WH available at 732 and accessing the SOC to energy lookup table at 734. The calculated SOC based on the entered DTE is then used by the non-braking regenerative capture strategy as previously described.

Figure 8:
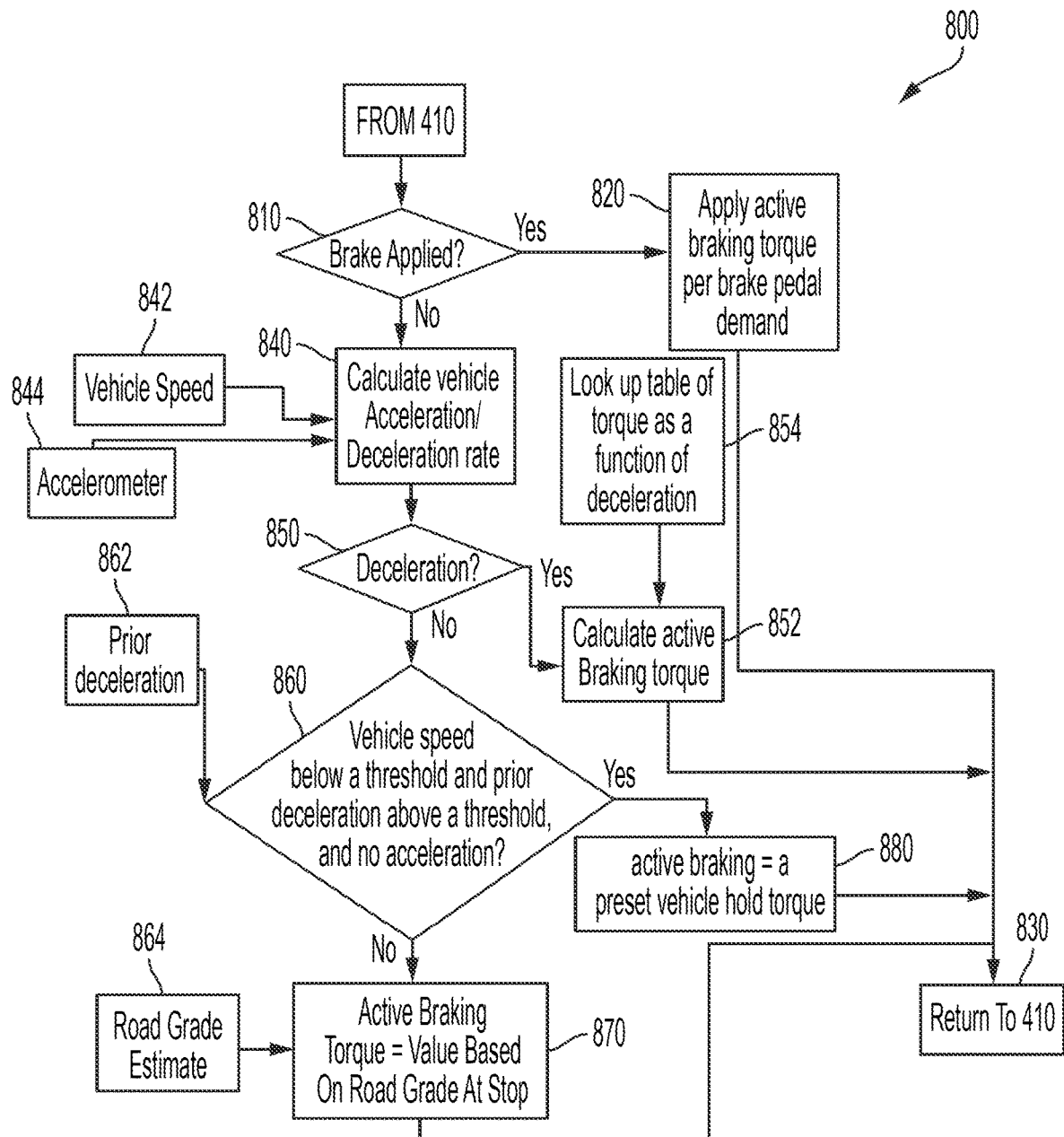
FIG. 8 is a block diagram illustrating operation of a system or method that controls active braking based on vehicle acceleration/deceleration in an electrified vehicle while being towed.

FIG. 8 is a block diagram illustrating operation of a system or method that controls active braking based on vehicle acceleration/deceleration in an electrified vehicle while being towed. Towed electrified vehicles using automatic deceleration detection to provide breakaway braking should come to a complete stop if they become disconnected form the towing vehicle. System or method 800 monitors the electrified vehicle deceleration to detect a potential breakaway situation and will apply more aggressive braking force using regenerative braking and friction braking to bring the towed electrified vehicle to a controlled stop. Because a hard stop by the towing vehicle may be difficult to distinguish from a breakaway condition, any subsequent acceleration will allow the towed electrified vehicle to release the brakes and resume normal towed vehicle functions.

Block 810 determines whether the brake pedal is depressed by a brake pusher installed in the vehicle. If Yes, block 820 applies active braking torque based on the brake pedal demand. This may include regenerative braking and friction braking as previously described. Control then returns to block 410 of FIG. 4 as indicated at 830. Otherwise, block 840 calculates a vehicle acceleration/deceleration rate at 840 based on vehicle speed 842 and/or input from one or more accelerometers 844. If deceleration exceeds an associated threshold at 850, then block 852 calculates an active braking torque using a lookup table 854 that provides a relationship between braking torque and deceleration. Control then returns to block 410 of FIG. 4 as indicated at 830.

If deceleration is below the associated threshold at 850, then block 860 determines whether vehicle speed is below a threshold, prior deceleration as represented at 862 was above a threshold, and acceleration is below a threshold. If yes, then block 880 sets the active braking request to a preset vehicle hold torque and control continues with block 410 of FIG. 4 as indicated at 830. Otherwise, block 870 sets the active braking torque to a value based on the estimated road grade from block 864 when the vehicle stops and control continues with block 410 of FIG. 4 as indicated at 830.

As generally represented in at least blocks 860, 862, 864, 870, and 880 of FIG. 8, if the towed electrified vehicle is disconnected from the towing vehicle, the towed vehicle will begin to decelerate. This will generate a braking signal that will add to the deceleration, generating more deceleration, and therefore pass the deceleration rate threshold. As the disconnected towed vehicle slows under this hard deceleration, the system commands the friction brakes to a preset vehicle hold torque, achieving the slowing of a vehicle that is disconnected and also keeping the vehicle at a stop when it comes to a rest. If the disconnection is a false detection, then the vehicle will begin to accelerate as the towing vehicle accelerates and the braking torque is released. Depending on the particular application, block 870 may set the predetermined active braking torque to zero. In other applications, block 870 may provide a predetermined active braking torque less than the predetermined vehicle hold torque of block 880, but greater than zero. The predetermined braking torque of block 870 may be selected based on road grade estimated at block 864 when the vehicle comes to a stop to so that the weight of the towed vehicle does not result in movement of the towing/towed vehicles on higher grades. The predetermined braking torque of block 870 may be less than the preset vehicle hold torque of block 880 so the vehicle combination can more easily accelerate after stopping.

As generally illustrated and described above, a system or method according to the disclosure may provide a strategy or algorithm for automatic braking of a towed electrified vehicle without any connection (hydraulic, mechanical, or electrical) to the towed vehicle braking system. As such, automatic braking of the towed electrified vehicle is provided without any added hardware, such as a brake pedal pusher, to the towed vehicle to perform this function. However, the towed electrified vehicle may automatically detect and work with a brake pedal pusher system, if desired. Embodiments may also provide the ability for the towed electrified vehicle to come to a complete controlled stop and maintain a stop with the friction brakes if the vehicle has become disconnected from the towing vehicle. Detection of acceleration of the towed vehicle after a breakaway condition has been triggered provides the ability for this condition to be reversed if the friction brakes were applied due to a fast or hard stop of the towing vehicle. Towed vehicle brake lights may also be activated, eliminating the need for a connection to be made to the towing vehicle braking system.

Those of ordinary skill in the art may recognize additional advantages based on the teachings and representative embodiments described above.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:
   an electric machine;
   a traction battery selectively connected to the electric machine;
   a human-machine interface (HMI); and
   a controller programmed to, after receiving a signal from the HMI enabling towed vehicle operation of the electrified vehicle, control the electric machine to generate a regenerative braking torque in response to deceleration of the electrified vehicle exceeding an associated deceleration threshold and road grade being below a road grade threshold.

2. The electrified vehicle of claim 1 wherein the regenerative braking torque is generated while the electrified vehicle is being towed without an electrical, mechanical, or hydraulic connection to a towing vehicle braking system.

3. The electrified vehicle of claim 1 wherein the braking torque includes regenerative braking torque and friction braking torque.

4. The electrified vehicle of claim 3 wherein the braking torque corresponds to a first predetermined holding torque in response to vehicle speed being below an associated speed threshold, prior deceleration being above an associated deceleration threshold, and vehicle acceleration being below an acceleration threshold, and corresponds to a second predetermined braking torque less than the first predetermined holding torque otherwise, wherein the second predetermined braking torque is based on the road grade.

5. The electrified vehicle of claim 1 wherein the controller is further programmed to control friction brakes of the electrified vehicle in response to the deceleration of the electrified vehicle exceeding the associated deceleration threshold.

6. The electrified vehicle of claim 5 wherein the controller is further programmed to release the friction brakes and control the electric machine to stop generating regenerative braking torque in response to acceleration of the electrified vehicle.

7. The electrified vehicle of claim 1 wherein the controller is further programmed to apply friction brakes of the electrified vehicle in response to detecting that the electrified vehicle has become disconnected from a towing vehicle, the friction brakes being applied until the electrified vehicle comes to a stop.

8. The electrified vehicle of claim 1 wherein the controller is further programmed to apply friction brakes of the electrified vehicle in response to detecting deceleration of the electrified vehicle exceeding a corresponding friction braking deceleration threshold, the friction brakes being released in response to electrified vehicle acceleration exceeding an associated acceleration threshold.

9. The electrified vehicle of claim 1 further comprising an accelerometer, wherein the controller receives a signal from the accelerometer indicative of deceleration of the electrified vehicle.

10. The electrified vehicle of claim 1 wherein the controller is further programmed to calculate the deceleration in response to a vehicle speed signal of the electrified vehicle.

11. A method for controlling an electrified vehicle having friction brakes, an electric machine, a traction battery, and a human-machine interface (HMI), comprising, by a vehicle controller:
    receiving a signal to activate towed vehicle operation via the HMI; and
    controlling braking of the electrified vehicle in response to electrified vehicle deceleration exceeding an associated deceleration threshold and road grade being below an associated road grade threshold.

12. The method of claim 11 wherein controlling braking comprises controlling the electric machine to provide regenerative braking torque to wheels of the electrified vehicle.

13. The method of claim 11 wherein controlling braking comprises controlling the friction brakes.

14. The method of claim 11 further comprising calculating electrified vehicle deceleration based on a vehicle speed signal from a vehicle speed sensor.

15. The method of claim 11 further comprising receiving a signal from an accelerometer indicative of electrified vehicle deceleration.

16. The method of claim 11 wherein controlling braking comprises controlling the electric machine to generate a regenerative braking torque and controlling the friction brakes to generate a friction braking torque until acceleration of the electrified vehicle exceeds an acceleration threshold.

17. An electrified vehicle system comprising:
    an electric machine powered by a traction battery;
    friction brakes;
    a human-machine interface (HMI);
    an accelerometer mounted to the electrified vehicle; and
    a controller programmed to, in response to a towed vehicle operation signal received via the HMI, control the friction brakes and the electric machine to generate a braking torque while the vehicle is being towed by a towing vehicle when electrified vehicle deceleration measured by the accelerometer mounted to the electrified vehicle exceeds an associated deceleration threshold and without receiving an electrical, mechanical, or hydraulic braking signal from the towing vehicle, wherein the controller is further programmed to control the braking torque to a first predetermined torque in response to vehicle speed of the electrified vehicle being below an associated speed threshold, prior electrified vehicle deceleration being above the associated deceleration threshold, and electrified vehicle acceleration being below an associated acceleration threshold, and to control the braking torque to a second predetermined torque less than the first predetermined torque otherwise.

18. The electrified vehicle system of claim 17 wherein the controller is further programmed to control the friction brakes and the electric machine to generate the braking torque only when road grade is less than an associated road grade threshold.

19. The electrified vehicle system of claim 17 wherein the controller is further programmed to control the friction brakes and the electric machine to generate the braking torque until acceleration of the electrified vehicle exceeds a corresponding acceleration threshold.

* * * * *